(No Model.)
P. ADIE.
LAWN EDGE TRIMMER.
No. 274,100.　　　　　　　　　　Patented Mar. 20, 1883.
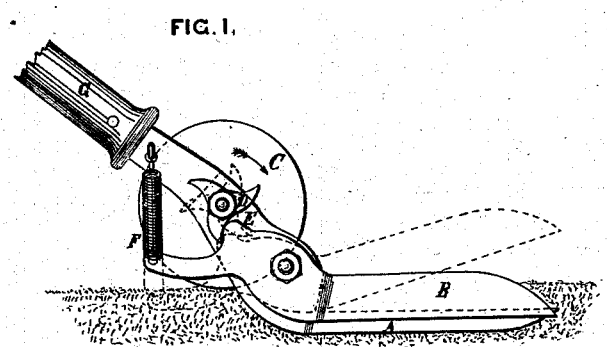
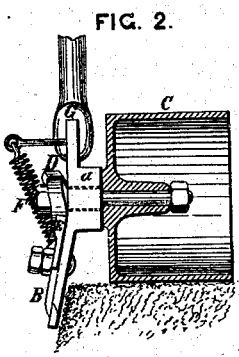
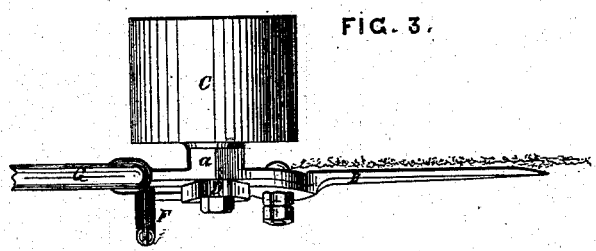
Witnesses
H. A. Daniels
William S. Poulter
Inventor
Patrick Adie

UNITED STATES PATENT OFFICE.

PATRICK ADIE, OF LONDON, ENGLAND.

LAWN EDGE-TRIMMER.

SPECIFICATION forming part of Letters Patent No. 274,100, dated March 20, 1883.

Application filed September 12, 1882. (No model.) Patented in England August 4, 1880, No. 3,185; in France September 28, 1880, No. 138,899; in Belgium September 30, 1880, No. 52,671; in Germany October 19, 1880, No. 13,655; in Italy, December 24, 1880, No. 12,434, and in Austria February 10, 1881, No. 812.

*To all whom it may concern:*

Be it known that I, PATRICK ADIE, of London, in the Kingdom of Great Britain, have invented certain new and useful Improvements in Lawn Edge-Trimmers; and I do hereby declare that the following is a full, clear, and exact description of the same.

This invention relates to improvements in means and machinery for edging grass and rapid cutting with shears or scissors, in which I combine with a pair of shears or scissors a roller which can be run along the surface that is to be edged, and which by its revolution, by means of suitable cam-teeth or wipers, gives reciprocating movement to one of the cutting-blades. I will describe the construction of a machine thus arranged for the purpose of edging grass walks or borders, referring to the accompanying drawings, in which—

Figure 1 is a side view. Fig. 2 is a front view, partly in section; and Fig. 3 is a plan.

A and B are the two blades of a pair of scissors or shears, the one A being the stationary blade, and the other, B, being the blade which by its up-and-down movement effects the cut. On the shank of the blade A I make a boss, a, which forms a bearing for a spindle passing through it. On one end of the spindle is fixed a roller, C, which rolls along the surface to be edged, and on the other end of the spindle I fix a set of cam teeth or wipers, D, of which there may be three, as shown, or other suitable number. A projection, E, from the blade B bears against these cam-teeth D, and a spring, F, is connected to the shank of the blade B, this spring being so placed as to pull in an oblique direction, and so cause the edge of the blade B, as it closes, to bear with shearing action against the edge of A. The shank of the blade A is let into a handle, G, by which the operator pushes the machine along. As it is so pushed the roller C revolves, and with it the wipers D, each of which in its turn raises the blade B by acting on its projection E. When the projection escapes the point of each wiper the spring F causes the blade B to close rapidly, so that the grass included between the two blades is shorn. It is of advantage to arrange the blades A and B so that their shearing-plane is somewhat inclined from the vertical, as this permits the cutting to be effected more closely to the edge.

Although I have described a machine suitable for such a purpose—as edging grass borders—it is obvious that machines of like construction might be employed for other purposes—such, for instance, as shearing the edges of paper-hangings, or generally for effecting a continuous shearing of material projecting beyond the edge of or lying on a surface along which the roller may be run. Machines such as I have described, instead of having one roller, might have two or more, according to the scale on which they might be made or the character of the work to which they might be applied; and the roller or rollers, instead of having the cam teeth or wipers fixed on their spindles, might be arranged to drive them by suitable gearing.

Having thus described the nature of my invention and in what manner the same is to be performed, I claim—

In an edge-trimmer for lawns, the combination of the handled blade A, roller C, and wipers D with the blade B, having boss E, and the spring F, all arranged for operation substantially as and for the purposes set forth.

PATRICK ADIE.

Witnesses:
ALEXANDER JAMES ADIE,
HENRY WILTSHIRE,
*Both of 15 Pall Mall, London.*